June 26, 1956  F. INGOLD  2,751,790
V-BELT PULLEY
Filed Sept. 15, 1953
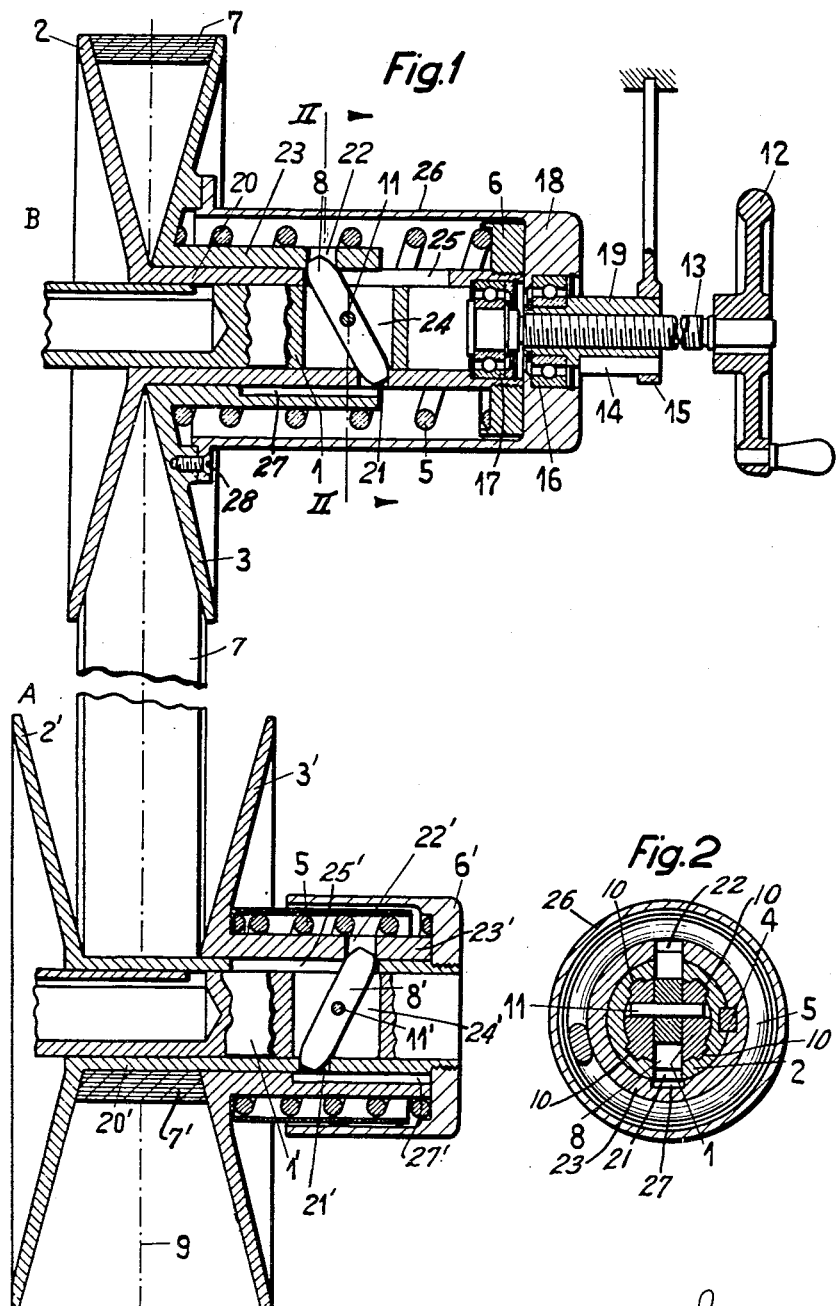
Inventor:
Fritz Ingold,
by Singer, Stern & Carlberg
Attorneys.

United States Patent Office 2,751,790
Patented June 26, 1956

2,751,790

V-BELT PULLEY

Fritz Ingold, Littau, Lucerne, Switzerland, assignor to Müller A. G. Maschinenfabrik und Eisengiesserei, Brugg, Aargau, Switzerland Application September 15, 1953, Serial No. 380,297

Claims priority, application Switzerland September 19, 1952

1 Claim. (Cl. 74—230.17)

The invention relates to a V-belt pulley and has the primary object of providing a V-belt pulley wherein two half-pulleys are resiliently pressed against the flanks of the V-belt, the force of pressure being balanced within the pulley itself.

It is another object of the invention to provide a V-belt pulley as aforesaid which positively controls the position of the V-belt thereon mechanically so that the latter always runs in the same plane perpendicular to the axis of rotation, and this with the use of a single resilient means.

It is yet another object of the invention to provide a V-belt pulley as aforesaid which allows to place the V-belt very close to the bearing in which the shaft of the pulley is journalled, while allowing ample axial length on the other side of the pulley for accommodating means for guiding the two half-pulleys axially relative to one another, means resiliently pressing the same towards one another, and means maintaining the plane of the belt run constant.

These and other objects and features of the invention will be clearly understood from the following detailed description of a preferred embodiment thereof given by way of example with reference to the accompanying drawings in which:

Fig. 1 is a longitudinal section through a V-belt transmission comprising two variable V-belt pulleys, and Fig. 2 is a transverse section along the line II—II of Fig. 1.

In the embodiment of the invention shown at B in Fig. 1, the pulley consists of a first disc 2 and a second disc 3 concentric with the first disc 2. Both discs are substantially cone-shaped with identical conicity but turned in opposite directions with the apex sides facing each other so as to form between them a substantially V-shaped groove for accommodating a V-belt 7.

The first pulley 2 is provided with a centrally disposed first tubular member 20 projecting from the apex side of said first pulley 2 through a second tubular member 23 concentrically projecting from the bottom side of the second pulley 3 and surrounding the first tubular member 20 with a sliding fit. The axial displacement of the second tubular member 23 on the first tubular member 20 is limited in one direction (to the left in Fig. 1) by engagement of the second disc 3 with the first disc 2 and in the opposite direction by abutment of the end of the second tubular member 23 against a collar 6 that is in screw thread engagement with the end of the first tubular member 20. A compression coil spring 5 surrounds the tubular members 2 and 3 and is in engagement at one end with the second disc 3 and at the other end with the collar 6.

A trunnion 1 that may form the end portion of a driving or a driven shaft (not shown) extends into the first tubular member 20, and the three elements 1, 20 and 23 are prevented from rotating in relation to each other by a key 4 (Fig. 2) disposed in keyways in the two tubular members 20 and 23 and by a splined connection between the trunnion 1 and the first tubular member 20, as indicated at 10 in Fig. 2. The trunnion 1 is provided with a longitudinal slot 24 registering with a longitudinal slot 25 in the first tubular member 20. A lever 8 is pivotally mounted in the slot 24 on a pin 11 extending transversely of the trunnion 1 through the slot 24 and located eccentrically with regard to the center line of the trunnion 1 to such an extent as to dispose the center line of the pin 11 at equal distance from the outside of the first tubular member 20 in the slot 25 and from the inside of said member 20 at a point diametrically opposite said slot 25.

One arm of the lever 8 extends into an aperture 21 in the first tubular member 20 and in order to ensure freedom of movement of this arm in the operation of the device as described below, the second tubular member 23 is provided with an inner longitudinal recess 27 in register with said aperture 21. The other arm of the lever 8 extends through the slot 25 in the first tubular member 20 into a registering aperture 22 in the second tubular member 23. The arms of the lever 8 are shaped to fit snugly in the apertures 21, 22 in any pivotal position of the lever 8.

The description up to this point applies word for word to the pulley shown at A in Fig. 1 if each of the reference marks used above and having a correspondence in the pulley at A is provided with a prime.

In the pulley at B in Fig. 1, the tubular members 20, 23 and associated elements are enclosed in a sleeve-shaped flange member 18, 26 secured to the second disc 3 by any suitable means, such as bolts 28. In the end wall 18 of said flange member a nut 19 is mounted in a ball bearing 16 concentric with said tubular members 20, 23, said nut 19 being in threaded engagement with a screw 13 provided with a handwheel 12 at its outer end. The screw 13 extends into the first tubular member 20 and is non-reciprocably connected therewith while being rotatable in relation to said first tubular member 20 through the intermediary of a ball bearing 17. The nut 19 is slidably mounted in a stationary bracket member 15 and prevented from rotation by means of a key 14 disposed in suitable key grooves in said nut and bracket member.

When it is desired to change the radial location of the V-belt 7 in the V-shaped groove between the discs 2 and 3 by increasing the width of said groove beyond the width shown in the portion B in Fig. 1, the handwheel 12 is rotated manually in a direction to move the screw 13 inwards (towards the left in Fig. 1) through the nut 19. This operation tends to push the first tubular member 20 with its disc 2 towards the left in Fig. 1 but due to the function of the lever 8 such movement cannot take place without an equal amount of movement of the second tubular member 23 and its disc 3 and nut 19 in the opposite direction, i. e. towards the right in Fig. 1, the nut 19 thereby sliding towards the right in the bracket member 15 without rotating. Accordingly, the abovementioned rotation of the handwheel causes the first disc 2 to moves towards the left while the second disc 3 moves an equal distance towards the right in Fig. 1, the result being that the V-belt 7 is permitted to drop deeper into the groove between the discs while remaining on the same center line 9. The limit of the movement is illustrated in the portion A of Fig. 1, where the V-belt 7' is shown at the bottom of the groove between the discs 2' and 3'. Said portion A of Fig. 1 also illustrates the fact that, in a V-belt transmission comprising two (or more) pulleys for the same V-belt only one of the pulleys need be provided with the manual operation device shown in the portion B of Fig. 1.

It will be noted that the tubular members 20, 23 and the entire associated mechanism are disposed at one side of the first disc 2, whereby it is feasible to mount the pulley with the opposite side of said first disc 2 very close to the bearing (not shown) for the trunnion 1 (or the shaft connected therewith) while at the same time the tubular members 20, 23 can be made long in order to provide excellent guidance in the sliding movements. The spring 5 serves to relieve stress from the lever 8 and axial load from the ball bearings 16, 17.

The appended claim is intended to cover all legitimate modifications of the invention.

What I claim is:

In a V-belt pulley, a first cone-faced disc, a first tubular hub member on said disc projecting axially therefrom at the apex side of the disc and provided with a longitudinal slot, a second cone-faced disc, a second tubular hub member on said second disc projecting axially therefrom at the base side of said second disc and slidably mounted on said first tubular member with the apex sides of the discs facing each other, said second tubular member being shorter than the first tubular member, a collar secured to said first tubular member beyond the end of said second tubular member, a compression coil spring surrounding said tubular members with one end abutting said collar and adapted to bias said second disc towards said first disc, an axially stationary trunnion in said first tubular member said trunnion having a longitudinal slot therein, means preventing relative rotation between said first and second tubular members, means preventing relative rotation between said first tubular member and said trunnion, a lever pivotally mounted in said slot in the trunnion for rotation on an axis perpendicular to the axis of said trunnion, one end of said lever axially drivingly engaging said second tubular member through said slot and the other end of said lever axially drivingly engaging said first tubular member so that sliding movement of one of said tubular members causes the other tubular member to slide an equal distance in the opposite direction, a screw, means rotatably and non-reciprocably supporting said screw in the end portion of said first tubular member concentrically therewith, a stationary bracket member, a nut slidably and non-rotatively mounted in said bracket member in operative engagement with said screw, a flange member secured to said second disc, and means rotatably and non-slidably connecting said flange member with said nut, whereby turning of said screw causes relative longitudinal movement between said first and second discs.

References Cited in the file of this patent

UNITED STATES PATENTS

| | | |
|---|---|---|
| 2,130,823 | Wilson | Sept. 26, 1938 |
| 2,185,411 | Lewellen | Jan. 2, 1940 |
| 2,256,114 | Heyer | Sept. 16, 1941 |
| 2,382,935 | Armitage | Aug. 14, 1945 |
| 2,637,215 | Rieser | May 5, 1953 |

FOREIGN PATENTS

| | | |
|---|---|---|
| 656,501 | Germany | Feb. 8, 1938 |
| 666,646 | Great Britain | Feb. 13, 1952 |